(12) United States Patent
Ye

(10) Patent No.: US 10,754,487 B2
(45) Date of Patent: Aug. 25, 2020

(54) TOUCH SENSOR WITH REDUCED EDGE BREAKAGE

(71) Applicant: WUHAN CHINA STAR OPTOELECTRONICS SEMICONDUCTOR DISPLAY TECHNOLOGY CO., LTD., Wuhan, Hubei (CN)

(72) Inventor: Jian Ye, Hubei (CN)

(73) Assignee: Wuhan China Star Optoelectronics Semiconductor Display Technology Co., Ltd., Wuhan, Hubei (CN)

( * ) Notice: Subject to any disclaimer, the term of this patent is extended or adjusted under 35 U.S.C. 154(b) by 49 days.

(21) Appl. No.: 16/099,205

(22) PCT Filed: Aug. 9, 2018

(86) PCT No.: PCT/CN2018/099506
§ 371 (c)(1),
(2) Date: Nov. 6, 2018

(87) PCT Pub. No.: WO2020/006808
PCT Pub. Date: Jan. 9, 2020

(65) Prior Publication Data
US 2020/0004358 A1    Jan. 2, 2020

(30) Foreign Application Priority Data
Jul. 2, 2018    (CN) .......................... 2018 1 0708143

(51) Int. Cl.
*G06F 3/044*    (2006.01)
*G06F 3/041*    (2006.01)

(52) U.S. Cl.
CPC ............ *G06F 3/0448* (2019.05); *G06F 3/044* (2013.01); *G06F 3/04164* (2019.05); *G06F 2203/04103* (2013.01)

(58) Field of Classification Search
CPC ........... G06F 3/044; G06F 2203/04103; G06F 3/0448; G06F 3/04164; H01L 27/3276
See application file for complete search history.

(56) References Cited

U.S. PATENT DOCUMENTS

| | | | |
|---|---|---|---|
| 2010/0163394 A1 | 7/2010 | Tang et al. | |
| 2015/0317009 A1* | 11/2015 | Hara | G01D 9/10 345/173 |
| 2017/0308205 A1 | 10/2017 | Cheng et al. | |
| 2018/0039358 A1* | 2/2018 | Xie | G06F 3/0412 |

(Continued)

FOREIGN PATENT DOCUMENTS

| CN | 101477430 A | 7/2009 |
|---|---|---|
| CN | 103576998 A | 2/2014 |

*Primary Examiner* — Laurence J Lee
(74) *Attorney, Agent, or Firm* — Mark M. Friedman

(57) ABSTRACT

A touch sensor is provided and includes: a sensing electrode, having sensing sub-electrodes arranged in an array; and a plurality of sensing electrode leads, arranged between adjacent two of the sensing sub-electrodes and connected to the sensing sub-electrodes. An edge of the sensing sub-electrodes includes a curved bump/recess, and the bumps and the recess of adjacent two of the sensing sub-electrodes are complementary to each other. The sensing electrode leads are arranged in a curved shape in a gap between adjacent two of the sensing sub-electrodes.

18 Claims, 1 Drawing Sheet

(56) References Cited

U.S. PATENT DOCUMENTS

| | | | |
|---|---|---|---|
| 2019/0278409 A1* | 9/2019 | Lee | G06F 3/0446 |
| 2020/0019279 A1* | 1/2020 | Xie | G06F 3/04166 |
| 2020/0042141 A1* | 2/2020 | Kwon | G06F 3/0448 |

* cited by examiner

TOUCH SENSOR WITH REDUCED EDGE BREAKAGE

FIELD OF THE INVENTION

The present disclosure relates to the technical field of touch displays, and more particularly to a touch sensor.

DESCRIPTION OF THE RELATED ART

Flexible AMOLED s (active-matrix organic light-emitting diodes) have good foldability and flexibility. Therefore, touch sensors, which are used together with such AMOLEDs, are also required to have good flexibility. Conventional touch sensors, no matter they are externally-mounted or integrated on a display screen in On-cell/In-cell manner, are usually made of transparent conductive films (such as ITO). However, since ITO is brittle semiconductor material, the touch sensors may break due to stress when being bent. Therefore, there is a risk of functional failure. For conventional touch electrode patterns, no matter in mutual-capacitive touch sensors or self-capacitive touch sensors, there is a risk of breakage along edges of touch electrode patterns due to a concentration of stress.

Hence, it is necessary to provide a touch sensor to overcome the problems existing in the conventional technology.

SUMMARY OF THE INVENTION

The present disclosure provides a touch sensor. Without any complex processes such as bridging, the risk of breakage at the sensing electrode patterns and their leads when the touch sensor is bent can be effectively reduced, and meanwhile, the touch sensitivity is improved and the visibility of the sensing electrode patterns is decreased.

For this purpose, the present disclosure employs the following technical solutions.

The present disclosure provides a touch sensor, including:
a sensing electrode, including at least two sensing sub-electrodes that are independent of each other and arranged in an array manner; and
a plurality of sensing electrode leads, disposed in a same layer as the sensing electrode and arranged in a gap between adjacent two of the sensing sub-electrodes;
one end of one of the sensing electrode leads is connected to one of the sensing sub-electrodes, and the other end of the one of the sensing electrode leads is connected to a processing circuit;
wherein the sensing sub-electrodes and the sensing electrode leads are manufactured by a same masking process; at least one portion of an edge of the sensing sub-electrodes includes a curved bump or recess, and the bump of one of the sensing sub-electrodes is complementary to the recess of an adjacent one of the sensing sub-electrodes; and the sensing electrode leads are arranged in a curved shape in a gap between adjacent two of the sensing sub-electrodes.

According to a preferred embodiment of the present disclosure, at least two of the sensing electrode leads are arranged in the gap between the adjacent two of the sensing sub-electrodes, and the at least two of the sensing electrode leads are disposed to be insulated from each other.

According to a preferred embodiment of the present disclosure, each of the sensing electrode leads includes a bent portion, an arc shape of the bent portion corresponds to a shape of the bump or the recess at the edge of the adjacent sensing sub-electrode, and the bent portion has a same radius of curvature as the bump or the recess at the edge of the adjacent sensing sub-electrode.

According to a preferred embodiment of the present disclosure, the bent portions of adjacent two of the sensing electrode leads have a same radius of curvature.

According to a preferred embodiment of the present disclosure, both the bump and the recess at the edge of the sensing sub-electrodes have a radius of curvature of 0.05 mm to 15 mm.

According to a preferred embodiment of the present disclosure, the sensing sub-electrodes are 0.5 mm to 10 mm in size.

According to a preferred embodiment of the present disclosure, both the sensing sub-electrodes and the sensing electrode leads are of a metal grid structure.

According to a preferred embodiment of the present disclosure, the sensing sub-electrodes and the sensing electrode leads are made of same material.

According to a preferred embodiment of the present disclosure, the sensing electrode leads extend in a same direction.

The present disclosure further provides a touch sensor which comprises:
a sensing electrode, including at least two sensing sub-electrodes that are independent of each other and arranged in an array manner; and
a plurality of sensing electrode leads, disposed in a same layer as the sensing electrode and arranged in a gap between adjacent two of the sensing sub-electrodes;
one end of one of the sensing electrode leads is connected to one of the sensing sub-electrodes, and the other end of the one of the sensing electrode leads is connected to a processing circuit;
wherein at least one portion of an edge of the sensing sub-electrodes includes a curved bump or recess, and the bump of one of the sensing sub-electrodes is complementary to the recess of an adjacent one of the sensing sub-electrodes; and the sensing electrode leads are arranged in a curved shape in a gap between adjacent two of the sensing sub-electrodes.

According to a preferred embodiment of the present disclosure, at least two of the sensing electrode leads are arranged in the gap between the adjacent two of the sensing sub-electrodes, and the at least two of the sensing electrode leads are disposed to be insulated from each other.

According to a preferred embodiment of the present disclosure, each of the sensing electrode leads includes a bent portion, an arc shape of the bent portion corresponds to a shape of the bump or the recess at the edge of the adjacent sensing sub-electrode, and the bent portion has a same radius of curvature as the bump or the recess at the edge of the adjacent sensing sub-electrode.

According to a preferred embodiment of the present disclosure, the bent portions of adjacent two of the sensing electrode leads have a same radius of curvature.

According to a preferred embodiment of the present disclosure, both the bump and the recess at the edge of the sensing sub-electrodes have a radius of curvature of 0.05 mm to 15 mm.

According to a preferred embodiment of the present disclosure, the sensing sub-electrodes are 0.5 mm to 10 mm in size.

According to a preferred embodiment of the present disclosure, both the sensing sub-electrodes and the sensing electrode leads are of a metal grid structure.

According to a preferred embodiment of the present disclosure, the sensing sub-electrodes and the sensing electrode leads are made of same material.

According to a preferred embodiment of the present disclosure, the sensing electrode leads extend in a same direction.

The advantage of the present disclosure is: with regard to the touch sensor of the present disclosure, by preparing a sensing electrode and sensing electrode leads in a same layer, no complex processes such as bridging are required. Both the manufacture difficulty and the manufacture cost are reduced. Furthermore, by designing at least a portion of the boundary of the sensing sub-electrode patterns into a plurality of curved bumps or recesses and also designing the sensing electrode leads connected to the sensing sub-electrodes into a curved shape, the concentration of stress toward the angled boundary is reduced, and the risk of the breakage of the sensing sub-electrode patterns and the sensing electrode leads during the bending is reduced effectively. Since the bumps and the recesses of two adjacent sensing sub-electrode patterns are complementary to each other, the cross-sectional area of the sensing sub-electrode patterns can be maximized to increase the change in the static capacitance during the touch and thus to improve the touch sensitivity. In addition, since a complex pattern, for example, a curved shape, is used at the edges of the sensing sub-electrode patterns and the sensing electrode leads, the diffusion at the edges is caused, so that the sensing sub-electrode patterns and the sensing electrode leads are not easily perceived by human eyes.

BRIEF DESCRIPTION OF THE DRAWINGS

In order to explain the technical solutions in the present embodiments or in the prior art more clearly, accompanying drawings required in the description of the present embodiments or prior art will be briefly described. Obviously, accompanying drawings are just some embodiments of the present disclosure, while other drawings may be obtained by those skilled in the art according to these drawings, without paying out any creative work.

DETAILED DESCRIPTION OF THE PREFERRED EMBODIMENTS

Figure 1:
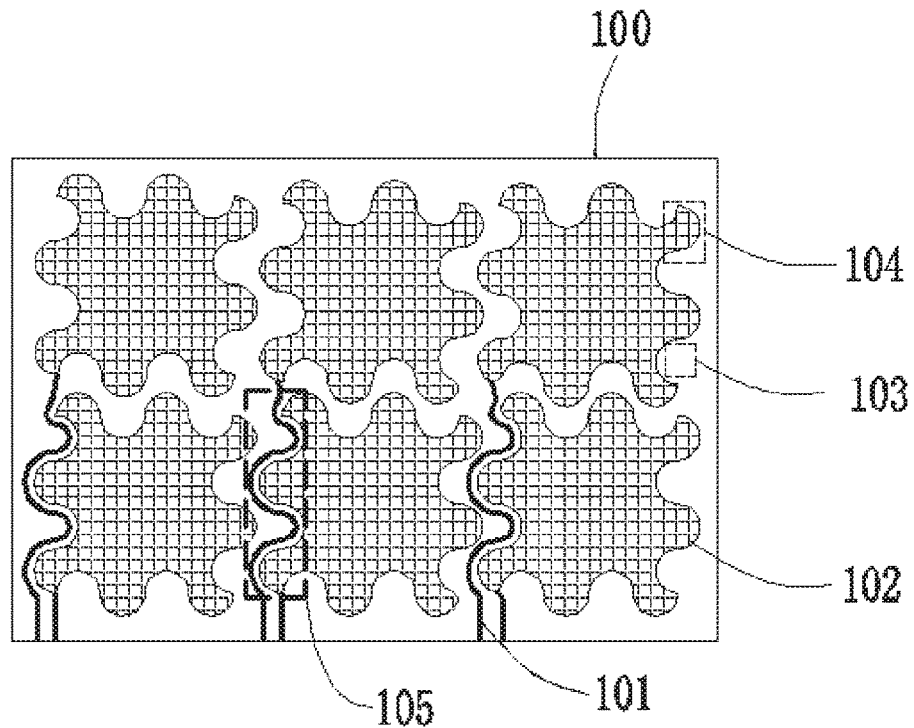
FIG. 1 is a partial plan view of a touch sensor according to an embodiment of the present disclosure.

The foregoing objects, features and advantages adopted by the present disclosure can be best understood by referring to the following detailed description of the preferred embodiments and the accompanying drawings. Furthermore, the directional terms described in the present disclosure, such as upper, lower, front, rear, left, right, inner, outer, side, etc., are only directions referring to the accompanying drawings, so that the used directional terms are used to describe and understand the present disclosure, but the present disclosure is not limited thereto. In the drawings, similar structural units are designated by the same reference numerals.

In view of the technical problem that breakage occurs, due to the stress, in the touch sensors in the prior art when they are bent because of the material and structure of the touch electrode patterns, the embodiments of the present disclosure are able to overcome the defects.

FIG. 1 is a partial plan view of a touch sensor according to an embodiment of the present invention. The touch sensor of the present invention comprises: a sensing electrode 100, configured to sense a touch signal when it is touched by a person or a conductor, sensing electrode 100 including a plurality of independent sensing sub-electrodes 102 arranged in an array; and sensing electrode leads 101, disposed in a same layer as sensing electrode 100 and arranged in a gap between adjacent two of the sensing sub-electrodes 102, and configured to transit or carry the touch signal sensed by sensing sub-electrodes 102 to a processing circuit; one end of one of sensing electrode leads 101 is connected to one of sensing sub-electrodes 102, and the other end of the one of the sensing electrode leads is connected to the processing circuit. At least one portion of an edge of the sensing sub-electrodes 102 includes at least one curved bump 104 and at least one recess 103. Preferably, the bumps 104 and recesses 103 are distributed along all edges of the sensing sub-electrodes 102. Each bump 104 of one of the sensing sub-electrodes 102 is complementary to a corresponding recess 103 of an adjacent one of the sensing sub-electrodes 102. There is a gap between each adjacent two sensing sub-electrodes 102; sensing electrode leads 101 are arranged in a curved shape in the gap between adjacent two sensing sub-electrodes 102, and sensing electrode leads 101 to which different ones of the sensing sub-electrodes 102 are connected run in a same direction to a preset position.

The sensing sub-electrodes 102 and the sensing electrode leads 101 are made of same material. The material for the sensing sub-electrodes 102 and the sensing electrode leads 101 includes, but is not limited to, one or more of Ti, Al, Ti, Ag and Cu.

Both the bumps 104 and the recesses 103 at the edge of the sensing sub-electrodes 102 each have a radius of curvature of 0.05 mm to 15 mm. The radius of curvature of the bumps 104 and the recesses 103 should not be too large or small. If the radius of curvature is too large, the bumps 104 and the recesses 103 will become almost a straight line and thus less effective in relaxing stress caused by bending, and as a result, the touch sensor may break. If the radius of curvature is too small, an obvious outline angle may be caused, and as a result, cracks may be caused during bending. Preferably, the bumps 104 and the recesses 103 have a radius of curvature of 0.1 mm to 10 mm. The sensing sub-electrodes 102 are 0.5 mm to 10 mm in size, preferably 1 mm to 6 mm.

Each of the sensing electrode leads 101 includes a bent portion 105, an arc shape of the bent portion 105 corresponds to a bump 104 and a recess 103 at the edge of adjacent sensing sub-electrodes 102. Preferably, the bent portion 105 has a same radius of curvature as the bump 104 or the recess 103 at the edge of the adjacent sensing sub-electrode 102. A corresponding portion, used to be connected to one end of the processing circuit, of the sensing electrode lead 101 may be a straight line. This facilitates gathering of sensing electrode leads 101, which is convenient for subsequent bundling. The bent portions 105 are not limited thereto. It is possible to arrange bent portions 105, spaced apart from each other, on sensing electrode leads 101; or bent portions 105 may have a different radius of curvature from bumps 104 or recesses 103, and are disposed to be insulated from each other.

Both the sensing sub-electrodes 102 and the sensing electrode leads 104 have a grid structure after being patterned during the preparation process. This design can resist against stress caused by bending of the flexible panel, and can disperse stress applied onto sensing sub-electrodes 102 and sensing electrode leads 101 to avoid damaging them. The sensing sub-electrodes 102 are located in a gap between two adjacent pixel units of a flexible panel, and the sensing electrode leads 101 corresponding to the sensing sub-electrodes 102 are also located in the gap between the two adjacent pixel units. Furthermore, since both the edges of sensing sub-electrodes 102 and sensing electrode leads 101 are in a curved shape, sensing sub-electrodes 102 and sensing electrode leads 101 are not easily perceived by human eyes. The effect of display will not be influenced. In addition, sensing sub-electrodes 102 are self-capacitive. A capacitance is generated between a person's finger and corresponding sensing sub-electrodes 102. The curved design of edges can effectively increase the area of a single sensing sub-electrode 102, thus increase the capacitance. Further, the touch sensitivity can be improved.

The specific touch principle will be described below. The sensing electrode provides information about an x/y-coordinate of a touched position. The touch of a person's finger on a protective cover results in a change in the self-capacitance of a sensing electrode below this position. The change in the self-capacitance is transferred to the processing circuit by sensing electrode leads 101, and then converted into an electric signal. In this way, a corresponding coordinate position is obtained. Since the bumps 104 and the recesses 103 of adjacent two sensing sub-electrodes 102 are complementary to each other, the cross-sectional area of sensing sub-electrodes 102 can be maximized to increase the change in static capacitance during a touch and thus improve the touch sensitivity.

Figure 2:
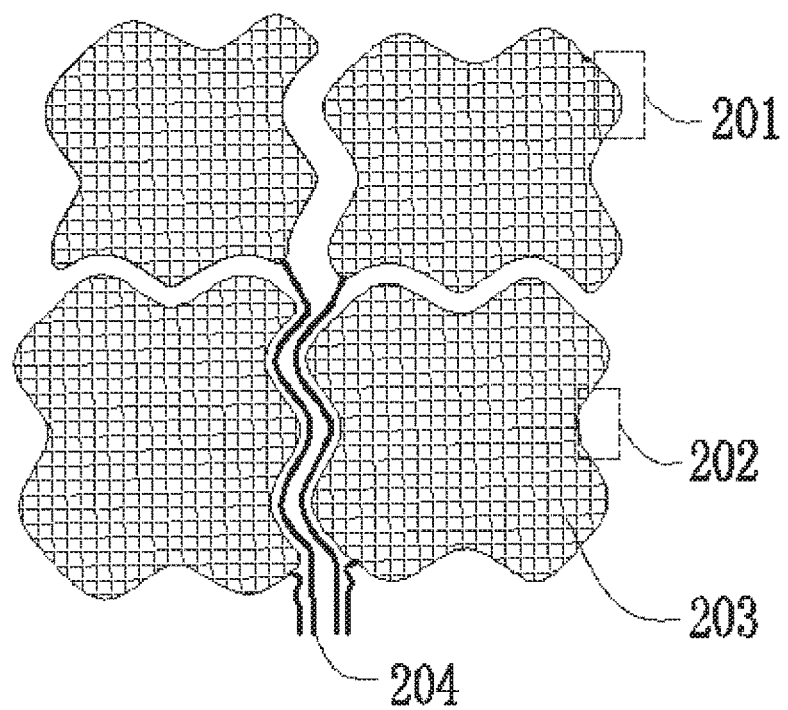
FIG. 2 is a partial plan view of another touch sensor according to an embodiment of the present disclosure.

FIG. 2 is a partial plan view of another touch sensor according to the embodiment of the present invention. The bumps 201 of the sensing sub-electrodes 203 and the recesses 202 between adjacent two of the bumps 201 may be non-uniformly distributed along edges of sensing sub-electrodes 203, and the bumps 201 and the recesses 202 of the sensing sub-electrodes 203 in two adjacent columns are complementary to each other. The sensing electrode leads 204 corresponding to sensing sub-electrodes 203 in a same column are located within a gap area at a side of the sensing sub-electrodes 203 in this column. That is, several sensing electrode leads 204 are arranged in a gap between the sensing sub-electrodes 203 in two adjacent columns. Each of the sensing electrode leads 204 includes a bent portion. The bent portions of adjacent two of the sensing electrode leads 204 have a same change in their curved direction. That is, adjacent two of the sensing electrode leads 204 are independently insulated from each other. Preferably, the bent portions of adjacent two of the sensing electrode leads 204 have a same radius of curvature. The specific shape of the sensing sub-electrodes 203 is not defined in the present invention. Since a complex pattern including the curved bump 201 and recess 202 is used in the sensing sub-electrodes 203, diffusion on the boundary of the sensing sub-electrodes 203 is increased, so that the sensing sub-electrodes 203 are not easily perceived by human eyes. Also, this reduces the concentration of stress toward the angled boundary, so that breakage of the sensing sub-electrodes 203 is avoided. Similarly, since the sensing electrode leads 204 comprise the bent portions, visibility is reduced and breakage is avoided.

The sensing sub-electrodes 203 and the sensing electrode leads 204 are integrally manufactured by a same masking process. For example, first, a whole metal layer is deposited on a substrate by PVD (Physical Vapor Deposition) or the like. The metal layer may be made of one of Ti, Al and Ag and an alloy thereof. Then, by a mask with a preset pattern, a corresponding touch electrode pattern is modeled in one step by processes such as exposure, developing and etching.

With regard to the touch sensor of the present invention, by preparing a sensing electrode and sensing electrode leads in a same layer, no complex processes such as bridging are required. Both the manufacture difficulty and the manufacture cost are reduced. Furthermore, by designing at least a portion of the boundary of the sensing sub-electrode patterns into a plurality of curved bumps or recesses and also designing the sensing electrode leads connected to the sensing sub-electrodes into a curved shape, the concentration of stress toward the angled boundary is reduced, and the risk of breakage of sensing sub-electrode patterns and sensing electrode leads during bending is reduced effectively. Since the bumps and the recesses of two adjacent sensing sub-electrode patterns are complementary to each other, the cross-sectional area of the sensing sub-electrode patterns can be maximized to increase the change in static capacitance during touch and thus improve the touch sensitivity. In addition, since a complex pattern, for example, a curved shape, is used along the edges of sensing sub-electrode patterns and sensing electrode leads, diffusion along the edges is caused, so that the sensing sub-electrode patterns and the sensing electrode leads are not easily perceived by human eyes.

In conclusion, although the present disclosure has been described with reference to the preferred embodiment thereof, it is apparent to those skilled in the art that a variety of modifications and changes may be made without departing from the scope of the present disclosure which is intended to be defined by the appended claims.

What is claimed is:

1. A touch sensor, comprising:
   a sensing electrode, comprising at least two sensing sub-electrodes that are independent of each other and arranged in an array manner; and
   a plurality of sensing electrode leads, disposed in a same layer as the sensing electrode and arranged in a gap between adjacent two of the sensing sub-electrodes;
   one end of one of the sensing electrode leads is connected to one of the sensing sub-electrodes, and the other end of the one of the sensing electrode leads is connected to a processing circuit;
   wherein the sensing sub-electrodes and the sensing electrode leads are manufactured by a same masking process; at least one portion of an edge of the sensing sub-electrodes includes a curved bump or recess, and the bump of one of the sensing sub-electrodes is complementary to the recess of an adjacent one of the sensing sub-electrodes; and the sensing electrode leads are arranged in a curved shape in a gap between adjacent two of the sensing sub-electrodes.

2. The touch sensor as claimed in claim 1, wherein at least two of the sensing electrode leads are arranged in the gap between the adjacent two of the sensing sub-electrodes, and the at least two of the sensing electrode leads are disposed to be insulated from each other.

3. The touch sensor as claimed in claim 1, wherein each of the sensing electrode leads includes a bent portion, an arc shape of the bent portion corresponds to a shape of the bump or the recess at the edge of the adjacent sensing sub-electrode, and the bent portion has a same radius of curvature as the bump or the recess at the edge of the adjacent sensing sub-electrode.

4. The touch sensor as claimed in claim 3, wherein the bent portions of adjacent two of the sensing electrode leads have a same radius of curvature.

5. The touch sensor according to claim 3, wherein both the bump and the recess at the edge of the sensing sub-electrodes have a radius of curvature of 0.05 mm to 15 mm.

6. The touch sensor as claimed in claim 1, wherein the sensing sub-electrodes are 0.5 mm to 10 mm in size.

7. The touch sensor as claimed in claim 1, wherein both the sensing sub-electrodes and the sensing electrode leads are of a metal grid structure.

8. The touch sensor as claimed in claim 1, wherein the sensing sub-electrodes and the sensing electrode leads are made of same material.

9. The touch sensor as claimed in claim 1, wherein the sensing electrode leads extend in a same direction.

10. A touch sensor, comprising:
a sensing electrode, comprising at least two sensing sub-electrodes that are independent of each other and arranged in an array manner; and
a plurality of sensing electrode leads, disposed in a same layer as the sensing electrode and arranged in a gap between adjacent two of the sensing sub-electrodes;
one end of one of the sensing electrode leads is connected to one of the sensing sub-electrodes, and the other end of the one of the sensing electrode leads is connected to a processing circuit;
wherein at least one portion of an edge of the sensing sub-electrodes includes a curved bump or recess, and the bump of one of the sensing sub-electrodes is complementary to the recess of an adjacent one of the sensing sub-electrodes; and the sensing electrode leads are arranged in a curved shape in a gap between adjacent two of the sensing sub-electrodes.

11. The touch sensor as claimed in claim 10, wherein at least two of the sensing electrode leads are arranged in the gap between the adjacent two of the sensing sub-electrodes, and the at least two of the sensing electrode leads are disposed to be insulated from each other.

12. The touch sensor as claimed in claim 10, wherein each of the sensing electrode leads includes a bent portion, an arc shape of the bent portion corresponds to a shape of the bump or the recess at the edge of the adjacent sensing sub-electrode, and the bent portion has a same radius of curvature as the bump or the recess at the edge of the adjacent sensing sub-electrode.

13. The touch sensor as claimed in claim 12, wherein the bent portions of adjacent two of the sensing electrode leads have a same radius of curvature.

14. The touch sensor according to claim 12, wherein both the bump and the recess at the edge of the sensing sub-electrodes have a radius of curvature of 0.05 mm to 15 mm.

15. The touch sensor as claimed in claim 10, wherein the sensing sub-electrodes are 0.5 mm to 10 mm in size.

16. The touch sensor as claimed in claim 10, wherein both the sensing sub-electrodes and the sensing electrode leads are of a metal grid structure.

17. The touch sensor as claimed in claim 10, wherein the sensing sub-electrodes and the sensing electrode leads are made of same material.

18. The touch sensor as claimed in claim 10, wherein the sensing electrode leads extend in a same direction.

* * * * *